(12) United States Patent
Long

(10) Patent No.: US 8,429,996 B2
(45) Date of Patent: Apr. 30, 2013

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 461 days.

(21) Appl. No.: 12/771,009

(22) Filed: Apr. 30, 2010

(65) Prior Publication Data
US 2011/0232411 A1 Sep. 29, 2011

(30) Foreign Application Priority Data
Mar. 24, 2010 (CN) .......................... 2010 1 0132027

(51) Int. Cl.
B25J 17/00 (2006.01)

(52) U.S. Cl.
USPC .......... 74/490.05; 74/490.06; 901/26; 901/29

(58) Field of Classification Search ............... 74/490.01, 74/490.02, 490.03, 490.05, 490.06; 901/15, 901/17, 23, 25, 26, 29
See application file for complete search history.

(56) References Cited

U.S. PATENT DOCUMENTS

| 4,854,808 | A  | * | 8/1989  | Bruno          | 414/680   |
|-----------|----|---|---------|----------------|-----------|
| 5,816,108 | A  | * | 10/1998 | Obata et al.   | 74/490.05 |
| 6,014,909 | A  | * | 1/2000  | Fiora          | 74/490.02 |
| 6,355,999 | B1 | * | 3/2002  | Kichiji et al. | 310/112   |
| 6,415,678 | B1 | * | 7/2002  | Nada           | 74/490.06 |
| 7,735,385 | B2 | * | 6/2010  | Wilson et al.  | 74/89.18  |
| 7,762,156 | B2 | * | 7/2010  | Chang et al.   | 74/490.06 |
| 7,926,377 | B2 | * | 4/2011  | Larsson et al. | 74/409    |
| 8,006,586 | B2 | * | 8/2011  | Tealdi et al.  | 74/490.02 |

* cited by examiner

Primary Examiner — David M Fenstermacher
(74) Attorney, Agent, or Firm — Altis Law Group, Inc.

(57) ABSTRACT

A robot arm assembly includes a first robot arm and a second robot arm rotatably connected to the first robot arm. The first robot arm includes a first sleeve, a first input shaft, and a second input shaft. The first input shaft and the second input shaft are seated in the first sleeve. The second robot arm includes a second sleeve and an output shaft received in the second sleeve. The first input shaft is connected to the second sleeve via a pair of bevel gears, and drives the second sleeve to rotate relative to the first sleeve. The second input shaft is connected to the output shaft via at least two pairs of bevel gears, and drives the output shaft to rotate relative to the second sleeve.

18 Claims, 4 Drawing Sheets

ROBOT ARM ASSEMBLY

BACKGROUND

1. Technical Field

The present disclosure relates generally to robot arm assemblies and, more particularly, to a robot arm assembly.

2. Description of Related Art

A commonly used industrial robot includes a fixed base, a frame pivotally connected thereto about a first rotation axis, a lower arm, one end of which is pivotally connected to the frame about a second rotation axis, and an upper arm, one end of which is pivotally connected to the other end of the lower arm about a third rotation axis. An actuator, such as a welding device, a gripper or a cutting tool, is mounted at a distal end of the upper arm of the industrial robot to execute specific tasks. Generally, six axes are utilized to achieve maximum movement of the actuator.

In robots of this kind, each arm rotates around a rotation axis driven by a driving unit. Typically, the driving unit includes a motor mounted on the lower arm and a speed reducer coupled to the motor to transmit the movement of the motor to the upper arm. The speed reducer may be a high gear ratio gear, such as a harmonic gear reducer, a RV reducer (rotary vector reducer), or a planetary reducer. The motor and the speed reducer are arranged along the rotation axis of the arm, rendering the range along the rotation axis relatively large. Thus, the robots are not adept to work in a small room. In addition, a cost of the speed reducer is high, such that the robots generally have a high manufacturing cost.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
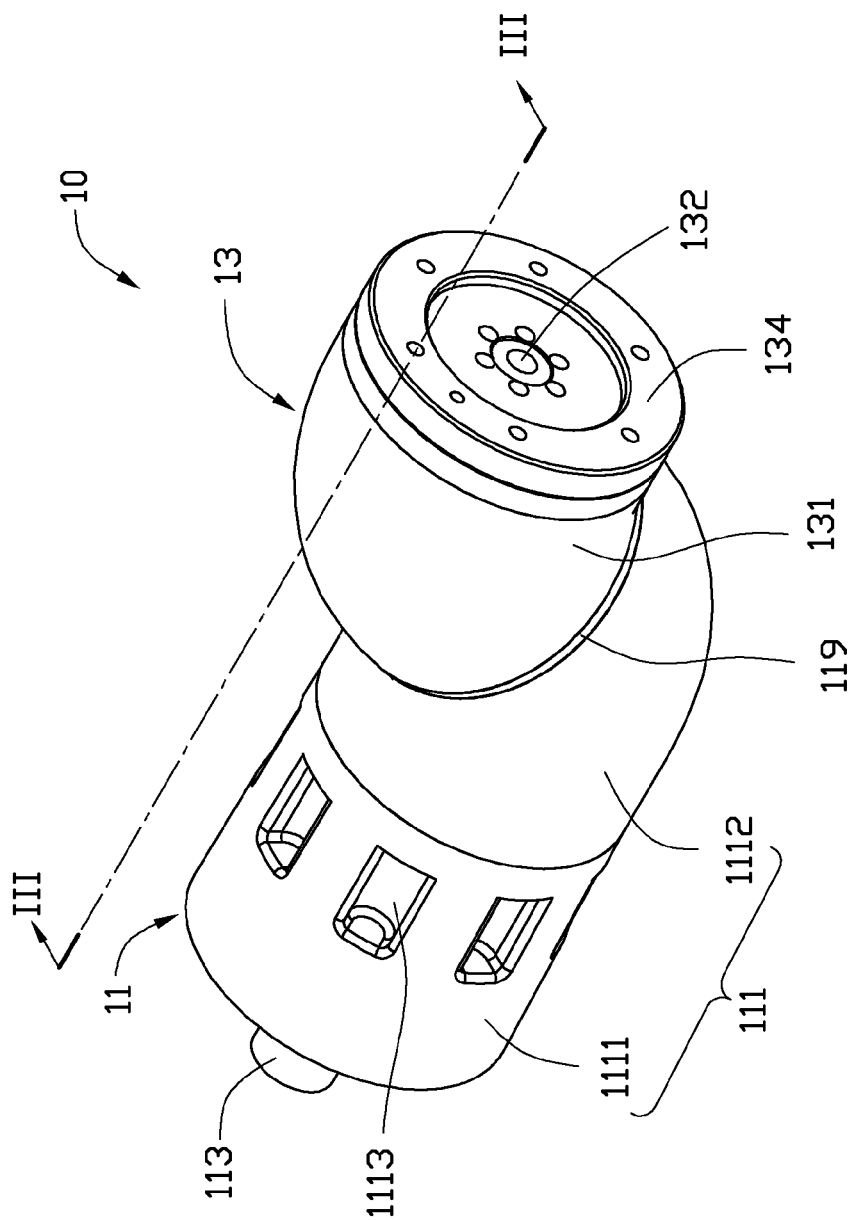
FIG. 1 is an assembled, isometric view of an embodiment of a robot arm assembly.
Figure 2:
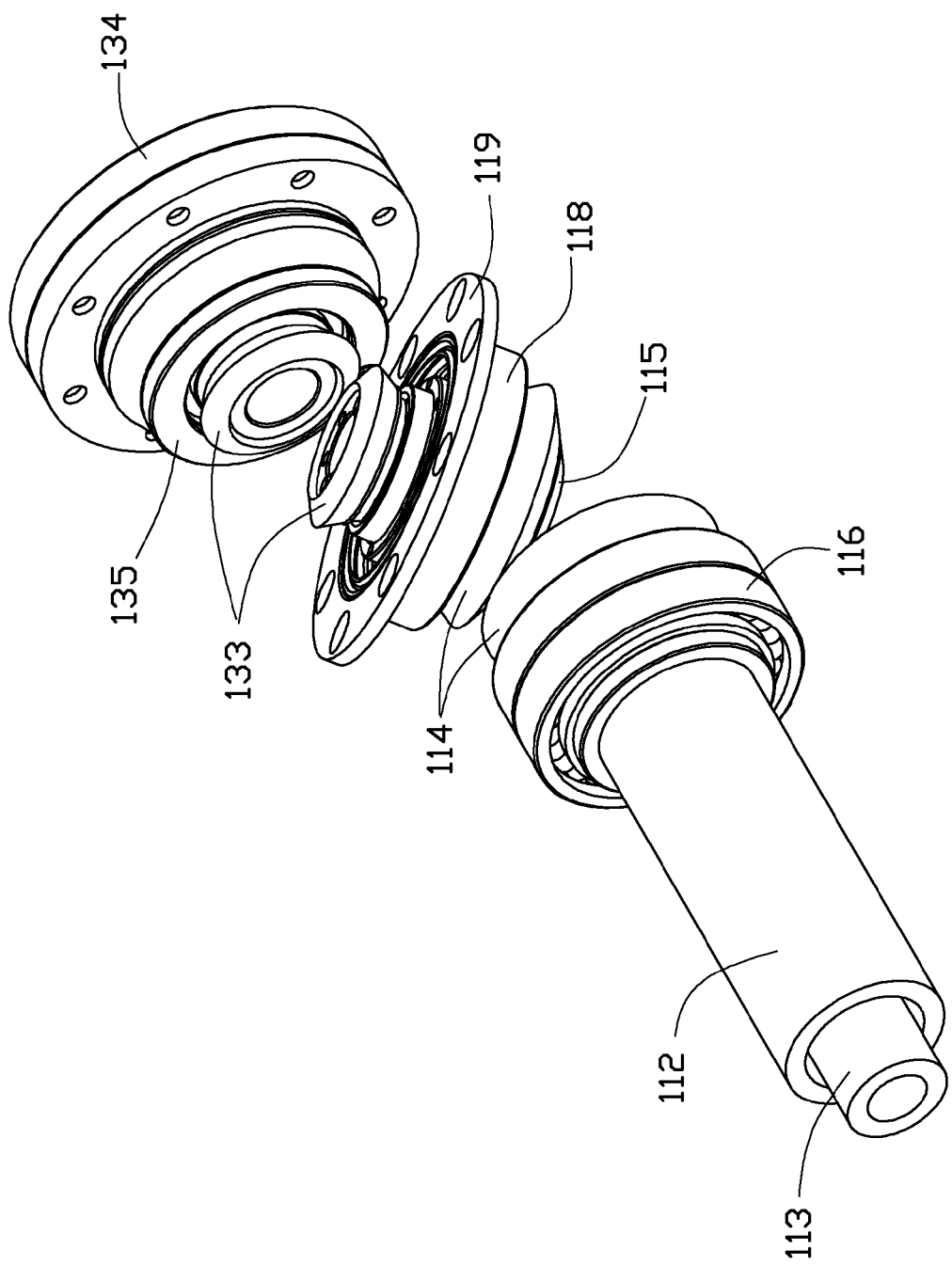
FIG. 2 is an isometric view of the robot arm assembly of FIG. 1 without a first sleeve and a second sleeve.
Figure 3:
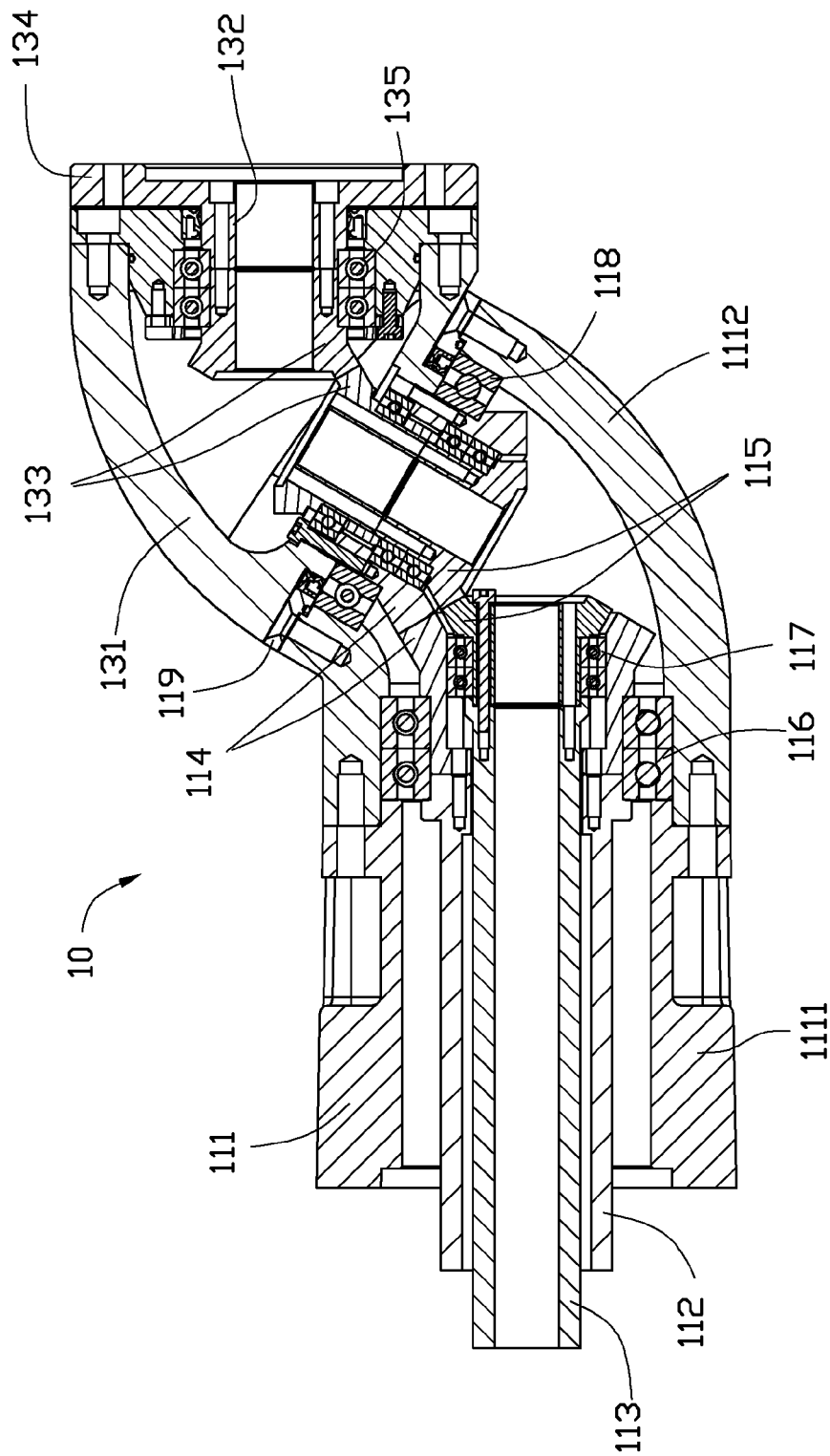
FIG. 3 a cross-sectional view of the robot arm assembly, taken along the line III-III.
Figure 4:
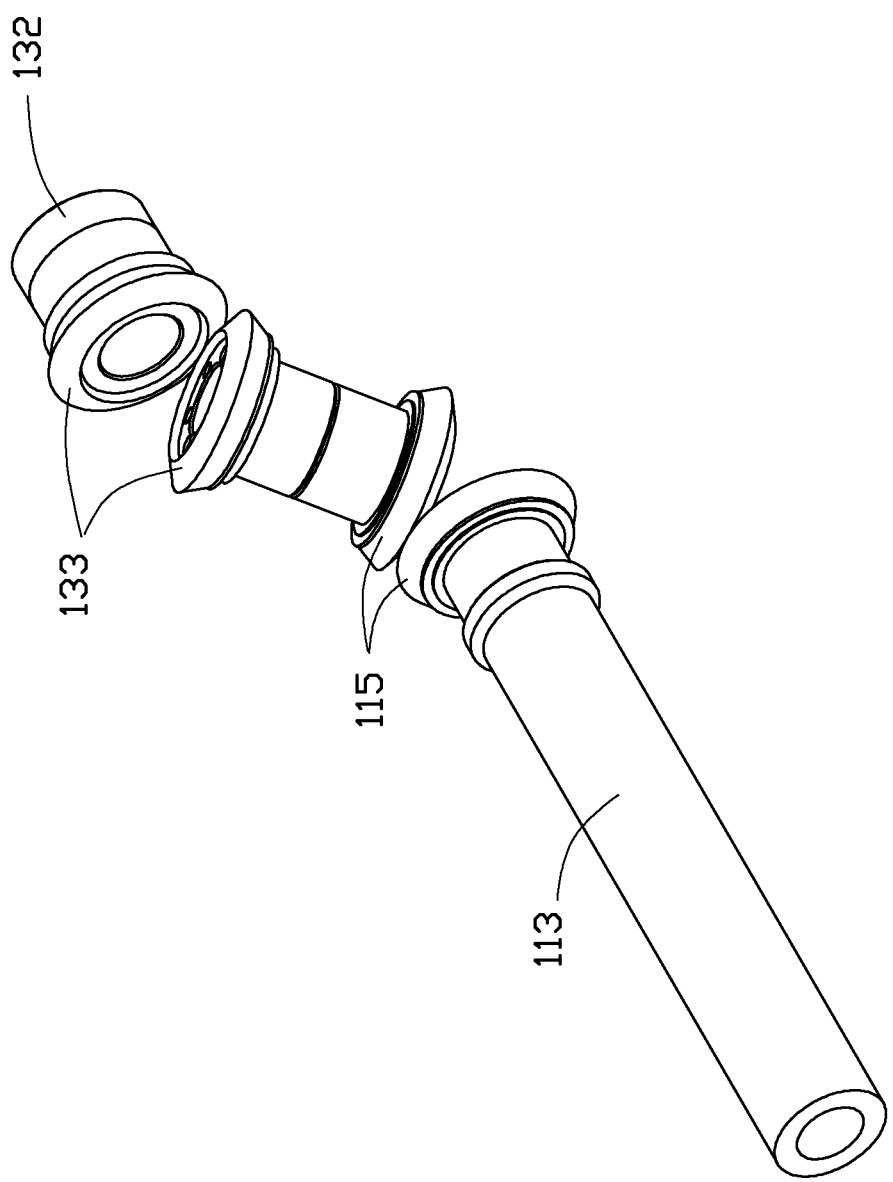
FIG. 4 is an isometric view of a second input shaft, an output shaft, and bevel gears of FIG. 2, the bevel gears connecting the second input shaft to the output shaft.

Referring to FIG. 1, an embodiment of a robot arm assembly 10 includes a first robot arm 11 and a second robot arm 13 rotatably connected to the first robot arm 11.

Referring to FIGS. 1 through 4, the first robot arm 11 includes a first sleeve 111, a first input shaft 112, a second input shaft 113, a pair of first bevel gears 114, and a pair of second bevel gears 115, a connecting member 119. The first input shaft 112, the second input shaft 113, the pair of first bevel gears 114, and the second pair of second bevel gears 115 are seated in the first sleeve 111.

The first sleeve 111 includes a straight sleeve section 1111 and an arc sleeve section 1112 connected to an end of the straight section 1111. The straight sleeve section 1111 defines a plurality of assembly grooves 1113 in an outer surface. The first input shaft 112 is rotatably seated in the straight sleeve section 1111 via a first bearing 116, and the second input shaft 113 is rotatably seated in the first input shaft 112 via a second bearing 116. In the illustrated embodiment, the first input shaft 112 and the second input shaft 113 are hollow tubes. One first bevel gear 114 is connected to an end of the first input shaft 112, and the other first bevel gear 114 is rotatably positioned in the arc sleeve section 1112 via a third bearing 118. The pair of first bevel gears 114 are meshed with each other. One second bevel gear 115 is connected to an end of the second input shaft 113 and partially received in the second bevel gear 115 connected to the first input shaft 112, and the other second bevel gear 115 is partially received in the first bevel gear 114 seated on the third bearing 118. The pair of second bevel gears 114 are meshed with each other. The connecting member 119 is positioned between the first robot arm 11 and the second robot arm 13.

The second robot arm 13 includes a second sleeve 131, an output shaft 132, a pair of third bevel gears 133, and a cover 134.

The second sleeve 131 is an arc sleeve in this embodiment. The second sleeve 131 is fixed to the third bearing 118, so that the second sleeve 131 can be driven to rotate relative to the first sleeve 111 by the first input shaft 112. One third bevel gear 133 is partially received in the first bevel gear 114 seated on the third bearing 118, and fixed to the second bevel gear 114. The other third bevel gear 133 is seated in the second sleeve 131 via a fourth bearing 135. The pair of third bevel gears 133 are meshed with each other. The cover 134 is fixed on an end of the second sleeve 131 away from the first sleeve 111. The cover 134 defines a pivot hole (not labeled) in a center. The output shaft 132 is fixed to the third bevel gear 133 seated on the fourth bearing 135, and extends through the pivot hole of the cover 134. In the illustrated embodiment, the first bevel gears 114, the second bevel gears 115, and the third bevel gears 133 are hollow bevel gears.

In use, the first and second input shaft 112, 113 are driven to rotate by external driving devices (not shown). The second sleeve 131 follows the rotation of the first input shaft 112 by the first bevel gears 114. The output shaft 132 follows the rotation of the second input shaft 113 by the second bevel gears 115 and the third bevel gears 133. It should be pointed out that the second input shaft 113 may drive the output shaft 132 to rotate by more than two pairs of bevel gears.

The first input shaft 112 is sleeved on the second input shaft 113, and a size of the first bevel gears 114, the second bevel gears 115 and the third bevel gears 133 is much smaller than the speed reducer, thus a total size of the robot arm assembly 10 can be small. Furthermore, a manufacturing cost of the first bevel gears 114, the second bevel gears 115 and the third bevel gears 133 is much lower than the speed reducer, thus a manufacturing cost of the robot arm assembly 10 is low. Additionally, a plurality of cables (not shown) can extend through the first input shaft 112, the pair of second bevel gears 115, the pair of third bevel gears 133, and the output shaft 132. That is, the cables can be positioned inside of the robot arm assembly 10, thus preventing the cables from current leakage and expose the robot arm assembly 10.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly, comprising:
   a first robot arm comprising a first sleeve, a first input shaft and a second input shaft, wherein the first sleeve comprises a straight sleeve section and an arc sleeve section connected to an end of the straight section, and the first input shaft and the second input shaft are seated in the straight sleeve section; and a second robot arm rotatably connected to the first robot arm, the second robot arm comprising a second sleeve and an output shaft received in the second sleeve;

wherein the first input shaft is connected to the second sleeve via a pair of bevel gears, and drives the second sleeve to rotate relative to the first sleeve, one of the pair of bevel gears connecting the first input shaft to the second sleeve is fixed to an end of the first input shaft, and the other one of the pair of bevel gears connecting the first input shaft to the second sleeve is rotatably positioned in the arc sleeve section; the second input shaft is connected to the output shaft via at least two pairs of bevel gears, and drives the output shaft to rotate relative to the second sleeve.

2. The robot arm assembly of claim 1, wherein the first input shaft is a hollow tube sleeved on the second input shaft.

3. The robot arm assembly of claim 2, wherein the second input shaft is a hollow tube.

4. The robot arm assembly of claim 1, wherein the first input shaft is rotatably seated in the first sleeve via a bearing.

5. The robot arm assembly of claim 1, wherein the second input shaft is connected to the output shaft via two pairs of bevel gears.

6. The robot arm assembly of claim 1, wherein the second robot arm comprises a cover positioned on an end of the sleeve, the cover defining a pivot hole, and the output shaft extends through the pivot hole of the cover.

7. The robot arm assembly of claim 1, wherein the second sleeve is an arc sleeve.

8. The robot arm assembly of claim 1, wherein the output shaft is rotatably seated in the second sleeve via a bearing.

9. The robot arm assembly of claim 1, wherein the first sleeve defines a plurality of assembly grooves in an outer surface.

10. A robot arm assembly, comprising:
a first robot arm comprising a first input shaft and a second input shaft; and
a second robot arm rotatably connected to the first robot arm, the second robot arm comprising a sleeve and an output shaft received in the sleeve;
wherein the first input shaft is connected to the sleeve via a pair of bevel gears, the second input shaft is connected to the output shaft via at least two pairs of bevel gears;
wherein the second input shaft, all of the at least two pairs of bevel gears, and the output shaft are hollow for cables extending through.

11. The robot arm assembly of claim 10, wherein the first input shaft is a hollow tube sleeved on the second input shaft.

12. The robot arm assembly of claim 10, wherein the first robot arm further comprise a sleeve, the sleeve comprises a straight sleeve section and an arc sleeve section connected to an end of the straight section.

13. The robot arm assembly of claim 12, wherein the first input shaft is rotatably seated in the sleeve of the first robot arm via a bearing.

14. The robot arm assembly of claim 13, wherein one of the pair of bevel gears connecting the first input shaft to the sleeve is fixed to an end of the first input shaft, and the other one of the pair of bevel gears connecting the first input shaft to the sleeve is rotatably positioned in the sleeve of the first robot arm.

15. The robot arm assembly of claim 10, wherein the second input shaft is connected to the output shaft via two pairs of bevel gears.

16. The robot arm assembly of claim 10, wherein the second robot arm comprises a cover positioned on an end of the sleeve, the cover defining a pivot hole, and the output shaft extends through the pivot hole of the cover.

17. The robot arm assembly of claim 10, wherein the sleeve is an arc sleeve.

18. The robot arm assembly of claim 10, wherein the output shaft is rotatably seated in the sleeve via a bearing.

* * * * *